(No Model.) 3 Sheets—Sheet 1.

A. H. ELFERS.
WATER ELEVATOR.

No. 408,406. Patented Aug. 6, 1889.

(No Model.) 3 Sheets—Sheet 2.
A. H. ELFERS.
WATER ELEVATOR.

No. 408,406. Patented Aug. 6, 1889.

Witnesses,
Geo. H. Strong.
J. H. Rouse

Inventor,
A. H. Elfers
By Dewey & Co.
atts (No Model.) 3 Sheets—Sheet 3.
A. H. ELFERS.
WATER ELEVATOR.
No. 408,406. Patented Aug. 6, 1889.
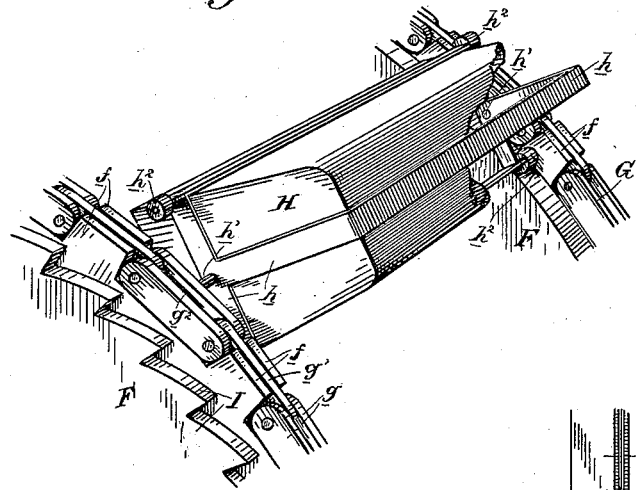
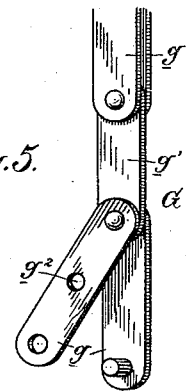
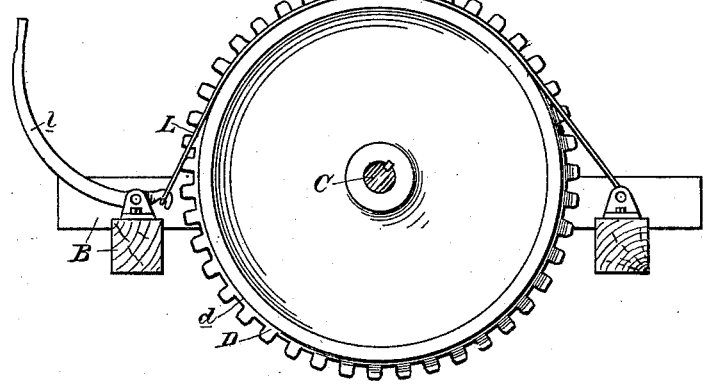
Witnesses,
Geo. H. Strong
J. H. Nourse
Inventor,
A. H. Elfers
By Dewey & Co.
Attys

UNITED STATES PATENT OFFICE.

AUGUST HENRY ELFERS, OF PHŒNIX, ARIZONA TERRITORY.

WATER-ELEVATOR.

SPECIFICATION forming part of Letters Patent No. 408,406, dated August 6, 1889.

Application filed December 22, 1888. Serial No. 294,373. (No model.)

*To all whom it may concern:*

Be it known that I, AUGUST HENRY ELFERS, of Phœnix, Maricopa county, Territory of Arizona, have invented an Improvement in Water-Elevators; and I hereby declare the following to be a full, clear, and exact description of the same.

My invention relates to that class of water-elevators in which buckets are attached to and carried by endless chains, whereby said buckets are successively carried down into the water so as to fill them, and raised therefrom and adapted to discharge their water at the top.

My invention consists in the hereinafter-described arrangement and construction of parts and details thereof.

The object of my invention is to provide a practical and effective elevator for raising water from wells and streams or other sources of supply for irrigating land and for all purposes for which large quantities of water are required.

Figure 1:
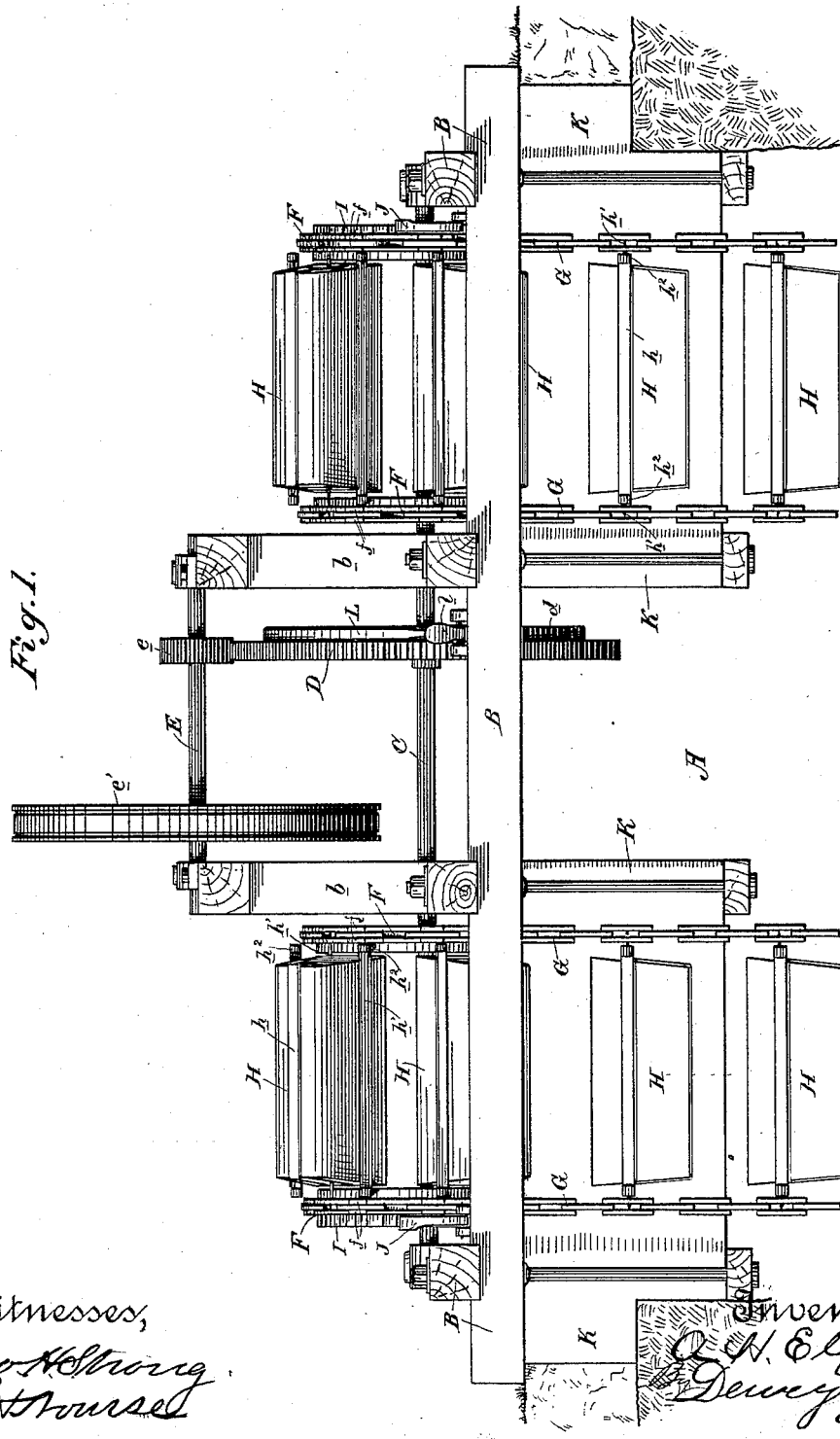
Figure 2:
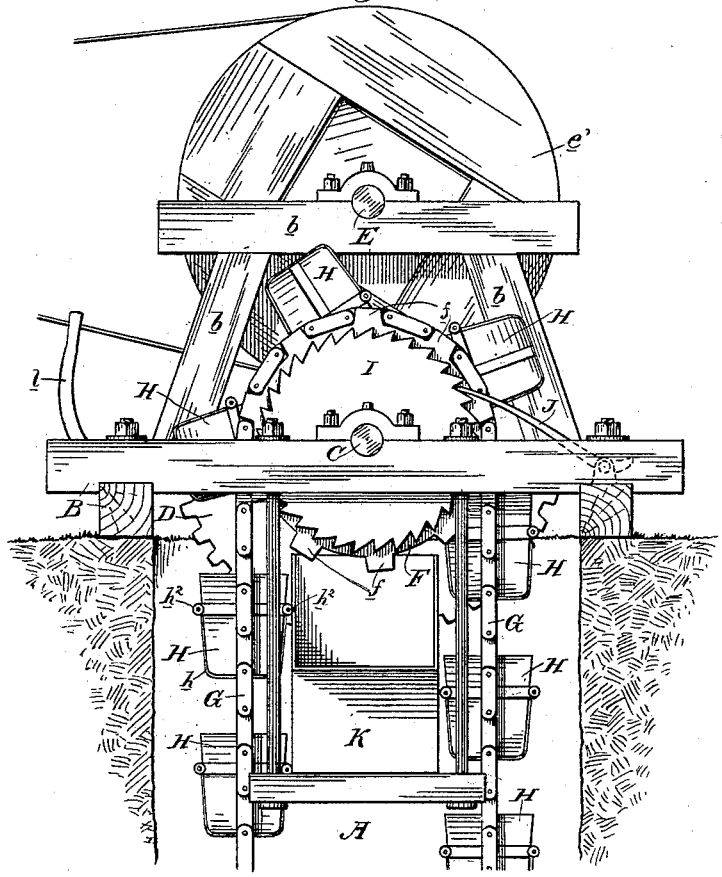
Figure 6:
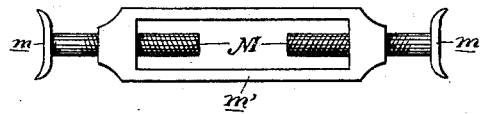

Referring to the accompanying drawings for a more complete explanation of my invention, Figure 1 is a side elevation of my water-elevator. Fig. 2 is an end view of the same. Fig. 3 is a detail perspective showing the tilting of the bucket. Fig. 4 is a detail of the brake governing the spur-wheel. Fig. 5 is a detail of the chain, showing the hole or socket in the inner one of the double links. Fig. 6 is a view of the spreader.

A represents the well, stream, pool, or other source of water-supply. Over this is fixed the foundation-frame B. (Here shown as consisting of two longitudinal timbers crossed by four transverse beams). Upon these beams is journaled a shaft C, which has near its center a spur-gear D, which meshes with a pinion $e$ on a counter-shaft E above, which said counter-shaft is mounted in the frame-standards $b$ and carries a belt-pulley $e'$, to which power is transmitted from any suitable source, as from a steam-engine, and by which power is transmitted to the shaft C.

Upon the shaft C, and upon each side of the frame-standards $b$, are fixed the sprocket-wheels F. There are two of these on each side, and they are formed with suitable teeth $f$, adapted to properly engage the endless chains.

G represents the endless chains. These are made up of a pair of parallel links $g$, alternating with a single link $g'$, pivoted to the double links, and these chains pass over and are engaged by the sprocket-wheels F, there being thus four of the chains, each two or pair of which forms a single carrier for the buckets.

H are the buckets. These are secured in and carried by a cradle $h$, which is formed of a frame-work embracing the sides, the ends, and the bottoms of the buckets, and each end of the cradle is provided with a pivot pin or gudgeon $h'$.

In the inner link of the double links $g$ of the endless chains G is made a hole $g^2$, into which the pivotal pin or gudgeon $h'$ of the cradle fits, whereby said cradle is carried by and pivotally suspended from the chains.

It will be observed that the outer link of the double links serves as a stop for the pivot pins or gudgeons $h'$ of the cradle, preventing it from moving sidewise, and holding and locking it in place, said cradle being inserted in its seat by spreading the chain, as I shall hereinafter describe.

Upon the ends of the side bars of the cradle $h$, which said ends are made to project, are journaled the anti-friction rollers $h^2$, which are adapted to come in contact with a flange of the sprocket-wheels F as each bucket comes to the top, whereby the bucket, pivotally suspended, as above described, is made to turn on its axis and to invert itself directly over the vertical central plane of the sprocket-wheels, whereby it is adapted to discharge its water, and as each bucket goes on over, the anti-friction rollers $h^2$ upon its other side turn it through the other half-revolution to its former position, so that it descends right side up.

Upon the outer side of the outer sprocket-wheel F, at each end of the frame-work B, is formed or secured a ratchet I, with which a pawl J, pivoted to the longitudinal timbers of the frame, is adapted to engage. These pawls are retaining-pawls, and serve to hold the mechanism temporarily and to prevent it from turning back while their engagement continues. They are also necessary in case the motive power is stopped at any time. Under the ends of the frame-work B are troughs K, one at each side. These troughs are located directly under the sprocket-wheels F and the buckets pass up and down on each side of them.

On one side of the main spur-gear D is formed a flange $d$, over which fits an ordinary strap-brake L, operated by a lever $l$. This brake is used for the purpose of lowering the buckets back into the well when work is to be stopped. It is very desirable that the motive power should start the apparatus with an empty set of buckets, for then the strain will come gradually upon the power, especially where the water is to be raised from a great depth.

It is evident that by placing the brake upon the large spur-wheel, disconnecting the motive power, and throwing the two pawls J out of the ratchet-teeth I upon the two outside sprocket-wheels F, I can lower the buckets back into the well again until an equality is attained—that is, until the weight of the buckets on one side balances the weight of the buckets on the other side, for the buckets without water counterbalance one another, so that all the power employed is directed in lifting the water. There is no friction to be overcome, and hence no consumption of power in that direction.

In Fig. 6 I show a small device by which the chains are adapted to be spread for the purpose of inserting the pivot-pins or gudgeons $h'$ of the bucket-cradles $h$. It is somewhat in the nature of a turn-buckle, consisting of two opposing arms M, having heads $m$, adapted to bear against the links of the chains, and their inner ends are reversely threaded, and seated upon each is a threaded nut or link $m'$. By turning this link the arms are forced outwardly in opposite disections, thereby spreading the chains.

The general operation of the device is as follows: Power is applied, through the gearing described, to rotate the shaft C, whereby the sprocket-wheels F are rotated. The chains G are thereby caused to travel, and the endless succession of buckets move down into the water and fill themselves, and up again to the sprocket-wheels, where, by means of the anti-friction rollers $h^2$ coming in contact with the sprocket-wheels, they are tilted successively to discharge their water into the underlying troughs K, and are brought back to position again to descend into the well. The troughs may be connected with ditches, into which they discharge their water. The troughs are constructed so that one-third of the water remains in them all the time. The object of the troughs is twofold, viz: to confine a certain amount of water, so that the discharge from the buckets will not splash unduly, and also having water in the troughs all the time it will keep them from shrinking and becoming leaky, as they will usually be made of wood, though it is obvious they can be made of other material as well.

I do not confine myself to the use of steam-power as a motive force, as I may employ horse-power, in which case the foundation and frame-work would be suitably modified and the power-transmitting gearing made to suit the circumstances.

Having thus described my invention, what I claim as new, and desire to secure by Letters Patent, is—

1. In a water-elevator, a frame-work having centrally-disposed power receiving and transmitting gearing and shafting and water-troughs located under each end thereof, in combination with a pair of sprocket-wheels over each trough, endless chains passing over said spocket-wheels, each pair of chains forming a carrier, a succession of pivotally-suspended buckets carried by the chains, and anti-friction rollers on the buckets adapted to come in contact with the sprocket-wheels and turn said buckets through a complete revolution at the top of their movement, whereby they discharge their water into the underlying troughs, substantially as herein described.

2. In a water-elevator, the rotary sprocket-wheels F and the endless chains engaged and caused to travel by said wheels, said chains having double links $g$, the inner one of which is provided with a hole or socket, in combination with the cradles having the end pins or gudgeons $h'$ fitting in the holes or sockets of the inner links of endless chains, whereby said cradles are pivotally suspended and locked in the chains and the buckets secured in the cradles, substantially as herein described.

3. In a water-elevator, the rotary sprocket-wheels F and the endless chains G, engaged and caused to travel by said wheels, in combination with the cradles $h$, pivotally suspended in the chains, the buckets H in the cradles, and the anti-friction rollers $h^2$ on the projecting ends of the cradle-sides, adapted to come in contact with the sprocket-wheels, whereby said buckets are made to turn through a complete revolution at the top of their movement, substantially as herein described.

4. A water-elevator comprising a frame-work over the well or other source of water-supply, having a centrally-disposed power receiving and transmitting mechanism, a longitudinal shaft C, with spur-gear D, having a flange $d$, and a strap-brake L, acting on said flange, sprocket-wheels F at each end of the shaft C, the outer one of which has ratchets I, and retaining-pawls J, engaging the ratchets, endless chains G, passing over said sprocket-wheels and down into the source of water-supply, pivotally suspended buckets H, carried by the chains, and having anti-friction rollers $h^2$ at each end for coming in contact with the sprocket-wheels and reversing the buckets to discharge their water, and underlying troughs K at each end into which the water is discharged by the buckets, substantially as herein described.

In witness whereof I have hereunto set my hand.

AUGUST HENRY ELFERS.

Witnesses:
VAN R. BEECHUM,
PHILIP K. HICKEY.